US008862829B2

(12) United States Patent
Yamazaki

(10) Patent No.: US 8,862,829 B2
(45) Date of Patent: Oct. 14, 2014

(54) CACHE UNIT, ARITHMETIC PROCESSING UNIT, AND INFORMATION PROCESSING UNIT

(75) Inventor: Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 12/929,026

(22) Filed: Dec. 22, 2010

(65) Prior Publication Data

US 2011/0161593 A1    Jun. 30, 2011

(30) Foreign Application Priority Data

Dec. 25, 2009   (JP) .................................. 2009-296261

(51) Int. Cl.
*G06F 12/00* (2006.01)
*G06F 12/08* (2006.01)

(52) U.S. Cl.
CPC .... *G06F 12/0895* (2013.01); *G06F 2212/1028* (2013.01); *Y02B 60/1225* (2013.01)
USPC ......................................................... 711/140

(58) Field of Classification Search
USPC ................................................. 711/125, 140
See application file for complete search history.

(56) References Cited

U.S. PATENT DOCUMENTS

| 2003/0065890 A1* | 4/2003 | Lyon ............................. 711/141 |
| 2005/0268076 A1* | 12/2005 | Henry et al. .................. 712/239 |
| 2007/0011406 A1 | 1/2007 | Takase et al. | |

FOREIGN PATENT DOCUMENTS

| JP | 07-134701 | 5/1995 |
| JP | 07-200404 | 8/1995 |
| JP | 11-184752 | 7/1999 |

OTHER PUBLICATIONS

The extended European Search Report for corresponding European Application 10196539.0-1229; dated Mar. 3, 2011.

* cited by examiner

*Primary Examiner* — Kalpit Parikh
(74) *Attorney, Agent, or Firm* — Staas & Halsey LLP

(57) ABSTRACT

A cache unit comprising a register file that selects an entry indicated by a cache index of n bits (n is a natural number) that is used to search for an instruction cache tag, using multiplexer groups having n stages respectively corresponding to the n bits of the cache index. Among the multiplexer groups having n stages, a multiplexer group in an $m^{th}$ stage has $2^{(m-1)}$ multiplex circuits. The multiplexer group in the $m^{th}$ stage uses a value of an $m^{th}$ bit (m is a natural number equal to or less than n) from the least significant bit in the cache index as a control signal. The multiplexer group in the $m^{th}$ stage switches all multiplex circuits included in the multiplexer group in the $m^{th}$ stage in accordance with the control signal.

6 Claims, 16 Drawing Sheets

FIG.8

| | BINARY NUMBER REPRESENTATION |
|---|---|
| ADDRESS 0 | 0000 |
| ADDRESS 1 | 0001 |
| ADDRESS 2 | 0010 |
| ADDRESS 3 | 0011 |
| ADDRESS 4 | 0100 |
| ADDRESS 5 | 0101 |
| ADDRESS 6 | 0110 |
| ADDRESS 7 | 0111 |
| ADDRESS 8 | 1000 |
| ADDRESS 9 | 1001 |
| ADDRESS 10 | 1010 |
| ADDRESS 11 | 1011 |
| ADDRESS 12 | 1100 |
| ADDRESS 13 | 1101 |
| ADDRESS 14 | 1110 |
| ADDRESS 15 | 1111 |

FIG.9

| | BINARY NUMBER REPRESENTATION |
|---|---|
| ADDRESS 0 | 0000 |
| ADDRESS 8 | 1000 |
| ADDRESS 4 | 0100 |
| ADDRESS 12 | 1100 |
| ADDRESS 2 | 0010 |
| ADDRESS 10 | 1010 |
| ADDRESS 6 | 0110 |
| ADDRESS 14 | 1110 |
| ADDRESS 1 | 0001 |
| ADDRESS 9 | 1001 |
| ADDRESS 5 | 0101 |
| ADDRESS 13 | 1101 |
| ADDRESS 3 | 0011 |
| ADDRESS 11 | 1011 |
| ADDRESS 7 | 0111 |
| ADDRESS 15 | 1111 |

CACHE UNIT, ARITHMETIC PROCESSING UNIT, AND INFORMATION PROCESSING UNIT

CROSS-REFERENCE TO RELATED APPLICATION(S)

This application is based upon and claims the benefit of priority of the prior Japanese Patent Application No. 2009-296261, filed on Dec. 25, 2009, the entire contents of which are incorporated herein by reference.

FIELD

The embodiments discussed herein are directed to a cache unit, an arithmetic processing unit, and an information processing unit.

BACKGROUND

In conventional arithmetic processing units, such as processors, high-speed cache memories running at a higher speed than the main memory units are installed in order to speed up processes. In some cases, the cache memories include instruction cache memories that hold instructions and operand cache memories that hold operands as dedicated cache memories.

Cache tags (TAG) are used to search for instruction caches and operand caches. For these cache tags, static random access memories (SRAM) that are random access memories (RAM) containing memory elements made up of transistors are usually used.

To reduce electrical power consumption of the cache tags, various technologies are known. For example, there is a known technology for reducing electrical power consumption by reducing the operations performed on an address array when an address of a cache memory being referred to is an address contiguous to the previous cache memory reference address that was referred to, and these addresses are in the same cache line (see Japanese Laid-open Patent Publication No. 11-184752). There is also another known technology for reducing electrical power consumption by using an SRAM cell made up of a transistor, as memory elements of a TAG memory and a DATA memory that constitute a cache memory (see Japanese Laid-open Patent Publication No. 07-134701). Furthermore, there is also another known technology for reducing electrical power consumption by using a DRAM as a cache data memory (see Japanese Laid-open Patent Publication No. 07-200404).

With the conventional technology, if a TAG memory is referred to, even when the same address as the one previously referred to is referred to again, a value is obtained again from the memory element of the TAG memory. Because the TAG memory is made up of an SRAM, electrical power is consumed every time a reading is performed by referring to the memory element of the SRAM. In an address decoder constituted of a dynamic circuit or a read path that uses a dynamic circuit, even when the same value is read from the same previously read address, pre charged electrical power is consumed because a dynamic circuit is used.

However, it is undesirable to consume electrical power at least when the same value is read from the same address. Furthermore, it is also desirable to reduce the electrical power consumption when the same value is read even though addresses are different. Furthermore, it is preferable that the electrical power consumption be reduced when a similar value is read even though a different value is read from a different address.

However, with the conventional technology for using an SRAM as a cache tag memory, there is a problem in that a large amount of electrical power is consumed when a value is read even when the same value or a similar value is read.

SUMMARY

According to an aspect of an embodiment of the invention, a cache unit includes a register file that selects an entry indicated by a cache index of n bits (n is a natural number) that is used to search for an instruction cache tag, using multiplexer groups having n stages respectively corresponding to the n bits of the cache index. Among the multiplexer groups having n stages, a multiplexer group in an $m^{th}$ stage has $2^{(m-1)}$ multiplex circuits. The multiplexer group in the $m^{th}$ stage uses a value of an $m^{th}$ bit (m is a natural number equal to or less than n) from the least significant bit in the cache index as a control signal. The multiplexer group in the $m^{th}$ stage switches all multiplex circuits included in the multiplexer group in the $m^{th}$ stage in accordance with the control signal.

According to another aspect of an embodiment of the invention, an arithmetic processing unit includes an instruction cache unit that holds an instruction, and an instruction processing unit that processes the instruction. The instruction cache unit includes a register file that selects an entry indicated by a cache index of n bits (n is a natural number) that is used to search for an instruction cache tag, using multiplexer groups having n stages respectively corresponding to the n bits of the cache index. Among the multiplexer groups having n stages, a multiplexer group in an $m^{th}$ stage has $2^{(m-1)}$ multiplex circuits. The multiplexer group in the $m^{th}$ stage uses a value of an $m^{th}$ bit (m is a natural number equal to or less than n) from the least significant bit in the cache index as a control signal. The multiplexer group in the $m^{th}$ stage switches all multiplex circuits included in the multiplexer group in the $m^{th}$ stage in accordance with the control signal.

According to still another aspect of an embodiment of the invention, an information processing unit includes an arithmetic processing unit, and a memory unit that supplies an instruction to the arithmetic processing unit. The arithmetic processing unit includes an instruction cache unit that holds the instruction, and an instruction processing unit that processes the instruction. The instruction cache unit includes a register file that selects an entry indicated by a cache index of n bits (n is a natural number) that is used to search for an instruction cache tag, using multiplexer groups having n stages respectively corresponding to the n bits of the cache index. Among the multiplexer group having n stages, a multiplexer group in an $m^{th}$ stage has $2^{(m-1)}$ multiplex circuits. The multiplexer group in the $m^{th}$ stage uses a value of an $m^{th}$ bit (m is a natural number equal to or less than n) from the least significant bit in the cache index as a control signal. The multiplexer group in the $m^{th}$ stage switches all multiplex circuits included in the multiplexer group in the $m^{th}$ stage in accordance with the control signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a schematic diagram illustrating control addresses when the control addresses are arranged in ascending order and represented in binary numbers;

FIG. 9 is a schematic diagram illustrating control addresses, represented in binary numbers, when the control addresses are arranged in accordance with a bit of the control addresses;

DESCRIPTION OF EMBODIMENT(S)

Preferred embodiments of the present invention will be explained with reference to accompanying drawings. The present invention is not limited to the embodiments described below.

[a] First Embodiment

Figure 1:
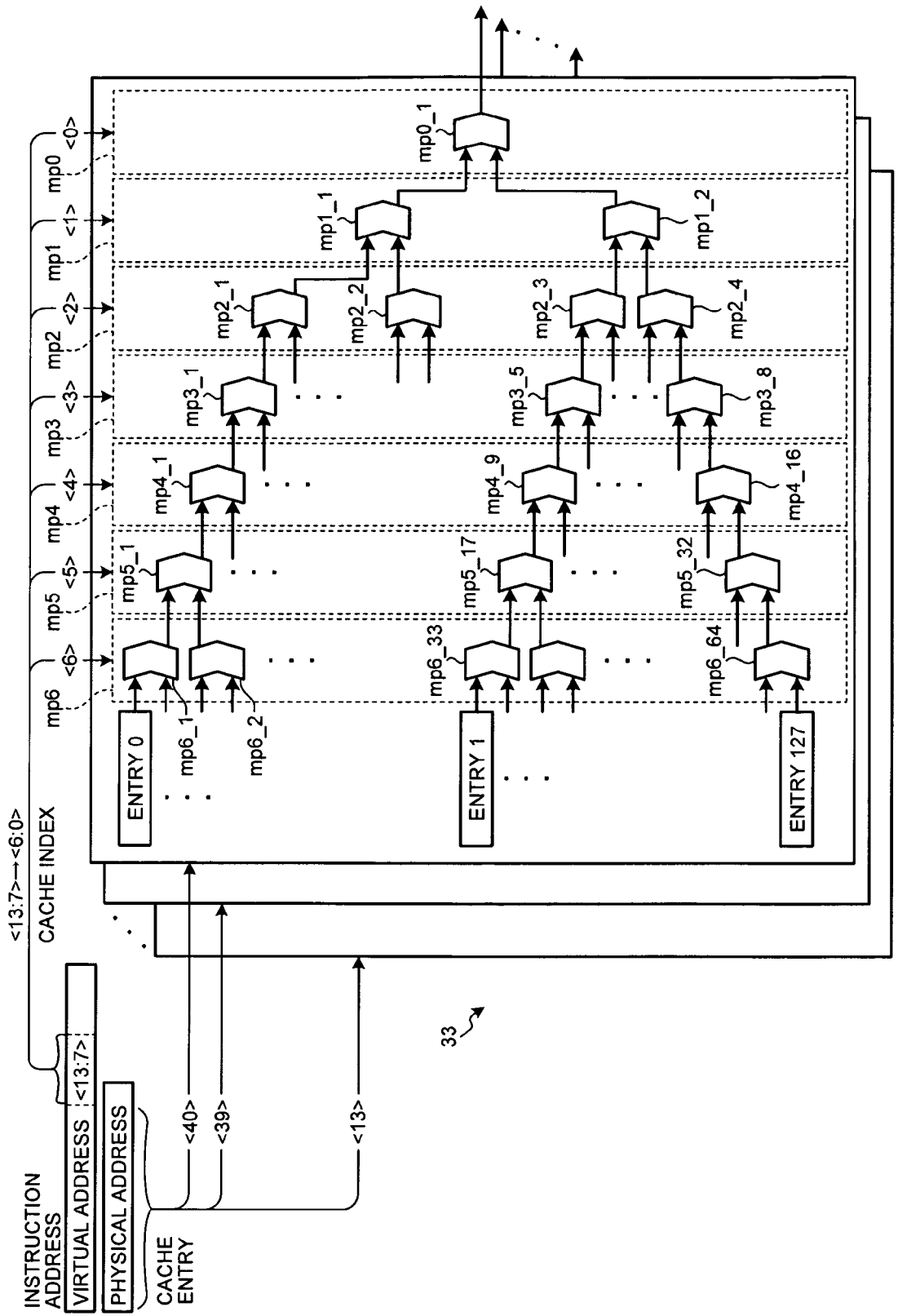
FIG. 1 is a schematic diagram illustrating an instruction cache tag according to a first embodiment.

FIG. 1 is a schematic diagram illustrating an instruction cache tag according to a first embodiment of the present invention. To make the most use of the feature of an instruction cache memory reference in which contiguous addresses are repeatedly referred to, the instruction cache unit according to the first embodiment has, instead of an SRAM, a register file as a physical component of a memory of an instruction cache tag.

Allocation of addresses to the register file that is used to refer to the instruction cache tag memory is made such that, when contiguous addresses are referred to, the ratio of multiplex circuits that switch a subject to be selected to all the multiplex circuits in a register file is low. When contiguous instruction addresses are referred to, the stage that is used for connecting a multiplexer is determined in accordance with the rate of changes in a bit that is related to tag memory reference. Specifically, the most significant bit of a tag memory reference address, which corresponds to a bit having the minimum rate of change, is connected to a first stage of a multiplexer circuit, and the least significant bit of the tag memory reference address, which corresponds to a bit having the maximum rate of change, is connected the last stage of the multiplexer circuit.

A commonly used register file that can be operated at high speed without power saving measures can be used for the register file of this embodiment. Such a register file uses, for data selection, a multiplexer that uses transfer gates. In this case, because the register file is used as the instruction cache tag, a part of an instruction address is used as a selection signal of the multiplexer. If the size of the cache line is 128 bytes, if the capacity of the cache is 32 kilobytes, and if the number of cache ways is 2, from among the instruction address bits <63:0>, address bits <13:7> corresponds to a cache index, which are input to a selection address in the register file In the example illustrated in FIG. 1, from among the instruction addresses, the address bits <13:7> which correspond to the cache index, are used, as control address bits <6:0>, to control the switching of the multiplexer.

The instruction address bits <63:13> are cache entries that are converted, using a TLB, from a virtual address to a physical address and are registered in an instruction cache tag 33. In the instruction address, for example, register files are arranged for each of the physical address bits <40:13>. In FIG. 1, a register file of an instruction address bit <40> will be described in detail, and descriptions of other bits will be omitted, because the behavior of other bits are the same with the instruction address bit <40>.

Entry 0 illustrated in FIG. 1 holds a value of a cache index portion, i.e., a value of an instruction address bit <40> when a 7-bit value of <13:7> is "0000000" in the instruction address. Entry 1 holds a value of a cache index portion, i.e., a value of an instruction address bit <40> when a 7-bit value of <13:7> is "0000001" in the instruction address. Similarly, entry 127 holds a value of a cache index portion, i.e., a value of an instruction address bit <40> when a 7-bit value of <13:7> is "1111111" in the instruction address.

In this way, the entries 0 to 127 each hold a cache index portion, i.e., a value of the instruction address bit corresponding to the register file in the case of a value of <13:7> being "0000000" to "1111111" in the instruction address.

The register file selects any one of the entries 0 to 127 and outputs a value of the selected entry. Accordingly, the multiplexer has seven stages. Here, a multiplexer group mp0 that is closest to an output is defined as a first stage, and a multiplexer group mp6 that is closest to an entry is defined as a seventh stage.

The multiplexer group mp6 in the seventh stage has 64 multiplexers mp6_1 to mp6_64. The multiplexers mp6_1 to mp6_64 select one of two entries and output a value that is held by the selected entry. Accordingly, 64 outputs are obtained from the multiplexer group mp6.

A multiplexer group mp5 in a sixth stage has 32 multiplexers mp5_1 to mp5_32. Each of the multiplexers mp5_1 to mp5_32 receives two inputs from among 64 outputs from the multiplexer group mp6, selects one input, and outputs the same value as that of the input. Accordingly, 32 outputs are obtained from the multiplexer group mp5.

A multiplexer group mp4 in a fifth stage has 16 multiplexers mp4_1 to mp4_16. Each of the multiplexers mp4_1 to mp4_16 receives two inputs from among 32 outputs from the multiplexer group mp5, selects one input, and outputs the same value as that of the input. Accordingly, 16 outputs are obtained from the multiplexer group mp4.

A multiplexer group mp3 in a fourth stage has eight multiplexers mp3_1 to mp3_8. Each of the multiplexers mp3_1 to mp3_8 receives two inputs from among 16 outputs from the multiplexer group mp4, selects one input, and outputs the same value as that of the input. Accordingly, eight outputs are obtained from the multiplexer group mp3.

A multiplexer group mp2 in a third stage has four multiplexers mp2_1 to mp2_4. Each of the multiplexers mp2_1 to mp2_4 receives two inputs from among eight outputs from the multiplexer group mp3, and outputs the same value as that of the input. Accordingly, four outputs are obtained from the multiplexer group mp2.

A multiplexer group mp1 in a second stage has two multiplexers mp1_1 and mp1_2. The multiplexer mp1_1 selects either one of the output of the multiplexer mp2_1 and the output of the multiplexer mp2_2 from the multiplexer group mp2 and outputs the same value. The multiplexer mp1_2 selects either one of the output of the multiplexer mp2_3 and the output of the multiplexer mp2_4 from the multiplexer group mp2 and outputs the same value.

A multiplexer group mp0 in a first stage has one multiplexer mp0_1. The multiplexer mp0_1 selects either one of the output of the multiplexer mp1_1 and the output of the multiplexer mp1_2 from the multiplexer group mp1 and outputs the same value. This output becomes an output of the register file.

In this way, any one of the entries 0 to 127 can be selected using the multiplexer groups mp0 to mp6 and the value thereof can be output.

To switch multiplexer mp0_1 included in the multiplexer group mp0, a least significant bit <7> of the instruction address bits of <13:7> that are used as the cache index is used. If the instruction address bits of <13:7> are read as the control address bits of <6:0>, the least significant bit <7> of the instruction address bits of <13:7> corresponds to a bit <0>. The multiplexer mp0_1 included in the multiplexer group mp0 is switched in accordance with whether this bit value is 0 or 1.

To switch the multiplexers mp1_1 to mp1_2 included in the multiplexer group mp1, a bit <8> is used, which is a second bit from the least significant bit of the instruction address bits of <13:7> that are used as the cache index. If the instruction address bits of <13:7> are read as the control address bits of <6:0>, the above bit <8> corresponds to a bit <1>. The multiplexers mp1_1 and mp1_2 included in the multiplexer group mp1 are switched in accordance with whether this bit value is 0 or 1. If the bit value has been changed, both the multiplexers mp1_1 and mp1_2 included in the multiplexer group mp1 are switched.

To switch the multiplexers mp2_1 to mp2_4 included in the multiplexer group mp2, a bit <9> is used, which is a third bit from the least significant bit of the instruction address bits of <13:7> that are used as the cache index. If the instruction address bits of <13:7> are read as the control address bits of <6:0>, the above bit <9> corresponds to a bit <2>. The multiplexers mp2_1 to mp2_4 included in the multiplexer group mp2 are switched in accordance with whether this bit value is 0 or 1. If the bit value has been changed, all of the multiplexers mp2_1 to mp2_4 included in the multiplexer group mp2 are switched.

To switch the multiplexers mp3_1 to mp3_8 included in the multiplexer group mp3, a bit <10> is used, which is a fourth bit from the least significant bit of the instruction address bits of <13:7> that are used as the cache index. If the instruction address bits of <13:7> are read as the control address bits of <6:0>, the above bit <10> corresponds to a bit <3>. The multiplexers mp3_1 to mp3_8 included in the multiplexer group mp3 are switched in accordance with whether this bit value is 0 or 1. If the bit value has been changed, all of the multiplexers mp3_1 to mp3_8 included in the multiplexer group mp3 are switched.

To switch the multiplexers mp4_1 to mp4_16 included in the multiplexer group mp4, a bit <11> is used, which is a fifth bit from the least significant bit of the instruction address bits of <13:7> that are used as the cache index. If the instruction address bits of <13:7> are read as the control address bits of <6:0>, the above bit <11> corresponds to a bit <4>. The multiplexers mp4_1 to mp4_16 included in the multiplexer group mp4 are switched in accordance with whether this bit value is 0 or 1. If the bit value has been changed, all of the multiplexers mp4_1 to mp4_16 included in the multiplexer group mp4 are switched.

To switch the multiplexers mp5_1 to mp5_32 included in the multiplexer group mp5, a bit <12> is used, which is a sixth bit from the least significant bit of the instruction address bits of <13:7> that are used as the cache index. If the instruction address bits of <13:7> are read as the control address bits of <6:0>, the above bit <12> corresponds to a bit <5>. The multiplexers mp5_1 to mp5_32 included in the multiplexer group mp5 are switched in accordance with whether this bit value is 0 or 1. If the bit value has been changed, all of the multiplexers mp5_1 to mp5_32 included in the multiplexer group mp5 are switched.

To switch the multiplexers mp6_1 to mp6_64 included in the multiplexer group mp6, a bit <13> is used, which is a seventh bit from the least significant bit of the instruction address bits of <13:7> that are used as the cache index. If the instruction address bits of <13:7> are read as the control address bits of <6:0>, the above bit <13> corresponds to a bit <6>. The multiplexers mp6_1 to mp6_64 included in the multiplexer group mp6 are switched in accordance with whether this bit value is 0 or 1. If the bit value has been changed, all of the multiplexers mp6_1 to mp6_64 included in the multiplexer group mp6 are switched.

For the instruction address in a normal program, width of the instruction decode is, for example, 32 bytes, which is sequentially added to an instruction address. If an instruction branch is present, the instruction address is switched to an address near the original address. Accordingly, the frequency of switching higher-order bits of an index address, i.e., bits on the <13> side, that is used to refer to the instruction cache tag is lower than the lower-order bits, i.e., bits on the <7> side.

In contrast, for the register files, when the value of a selection signal that is used in the seventh stage at which an entry is selected is switched, because all the pieces of selection logic in the seventh stage simultaneously act, electrical power consumption is high. In contrast, when the value of a selection signal that is used in the first stage is switched, because only a single piece of selection logic in the first stage acts, electrical power consumption is low.

Accordingly, higher-order bits of the instruction address that are less frequently switched are allocated to a control of the stage on the entry selection side of the register file. Lower-order bits of the instruction address that are more frequently switched are allocated to a control of the stage on the output side of the register file. By doing so, it is possible to reduce electrical power consumption required to search for instruction cache tags.

If the instruction address is less than 128 bytes in a cache line, because the cache index is not changed, an address that is input to the register file is not changed; therefore, electrical power is not consumed. Even when an address that is input to the register file is changed because it exceeds the cache line, because a selected signal that varies in the multiplexer in the register file can be reduced to a minimum, electrical power consumption can be reduced.

For example, in the example illustrated in FIG. 1, if the entry 0 is selected, by setting the control address of <6:0> to "0000000", a path through the multiplexers mp6_1, mp5_1, mp4_1, mp3_1, mp2_1, mp1_1 and mp0_1 is established. From this state, by switching only the multiplexer mp0_1, a path through the multiplexers mp6_33, mp5_17, mp4_9, mp3_5, mp2_3, mp1_2, and mp0_1 is established. This makes it possible to select the entry 1. By setting the control address of <6:0> to "1111111", a path through the multiplexers mp6_64, mp5_32, mp4_16, mp3_8, mp2_4, mp1_2, and mp0_1 is established.

Figure 2:
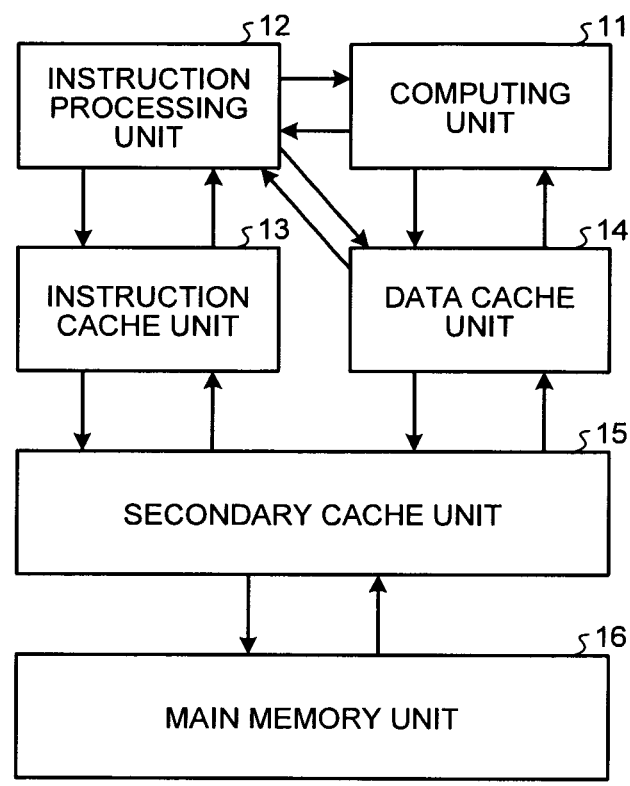
FIG. 2 is a block diagram of an arithmetic processing unit using the instruction cache unit illustrated in FIG. 1.

FIG. 2 is a block diagram of an arithmetic processing unit using the instruction cache unit illustrated in FIG. 1. However, FIG. 2 only illustrates, as an example, some of the components constituting a central processing unit (CPU) that is the arithmetic processing unit. Accordingly, in FIG. 2, not all the components constituting the arithmetic processing unit according to the first embodiment are illustrated. Furthermore, the arithmetic processing unit according to the first embodiment does not necessarily have all of the components illustrated in FIG. 2.

As illustrated in FIG. 2, an arithmetic processing unit includes therein a computing unit 11, an instruction processing unit 12, an instruction cache unit 13, a data cache unit 14, and a secondary cache unit 15.

The arithmetic processing unit performs an arithmetic operation in accordance with instructions stored in a memory unit in a computer and performs a process on information in accordance with the arithmetic operation results. Note that the "instruction" mentioned here is not a command that is input from a keyboard by a user using the computer or a command indicated as a single line of a program that is programmed by a developer. Such a command is translated to, first in the computer, a computer readable machine language; is then re-configured as a binary number that can be recognized by the computer; and subsequently, if the binary number is divided into the minimum unit that can be processed by the CPU, becomes an instruction that can be processed by the CPU.

The instruction processing unit 12 controls the flow of the process performed by the arithmetic processing unit. Specifically, the instruction processing unit 12 reads an instruction to be processed from a main memory unit 16, interprets the instruction, and sends the interpreted result to the computing unit 11. The computing unit 11 is a processing unit that performs computing. Specifically, the computing unit 11 reads target data for the instruction from the main memory unit 16, performs computing in accordance with the instruction interpreted by the instruction processing unit 12, and sends the computing result to the instruction processing unit 12.

A memory unit, from which the instruction processing unit 12 or the computing unit 11 reads an instruction or data, includes a main memory and a cache memory. The cache memory includes, for example, a primary (Level 1) cache (hereinafter, referred to as an "L1 cache") or a secondary (Level 2) cache (hereinafter, referred to as an "L2 cache"). These cache memories are usually arranged in the arithmetic processing unit in a hierarchical structure. The CPU illustrated in FIG. 2 includes, as the L1 cache, the instruction cache unit 13 that is the L1 cache dedicated to instructions and the data cache unit 14 that is the L1 cache dedicated to data.

Furthermore, the secondary cache unit 15 is arranged as the L2 cache. The main memory unit 16 is not a component constituting the arithmetic processing unit but is arranged, as a memory unit, outside of the arithmetic processing unit.

The instruction cache unit 13 and the data cache unit 14 can act using the same clock as the arithmetic processing unit and can respond, at high speed, to a request from the instruction processing unit 12 or the computing unit 11. However the capacity of the instruction cache unit 13 and the data cache unit 14 is usually about 32 KB to 128 KB in total; therefore, the amount of storable information is not much. Accordingly, the secondary cache unit 15 stores therein frequently used information from among information that cannot be stored in the instruction cache unit 13 nor the data cache unit 14. Furthermore, information that cannot be stored in the secondary cache unit 15 is stored in the main memory unit 16.

When the instruction processing unit 12 or the computing unit 11 starts processing, an instruction or data is present in the main memory unit 16 and thus nothing is stored in the instruction cache unit 13, the data cache unit 14, nor the secondary cache unit 15. When the instruction processing unit 12 or the computing unit 11 reads the instruction or the data from the main memory unit 16, the instruction or the data is loaded into the instruction cache unit 13, the data cache unit 14, or the secondary cache unit 15. After that, the instruction processing unit 12 or the computing unit 11 reads the instruction or data from, instead of the main memory unit 16 that runs at low speed, the instruction cache unit 13, the data cache unit 14, or the secondary cache unit 15, which runs at high speed.

In other words, the instruction or the data that the instruction processing unit 12 or the computing unit 11 attempts to read is not always stored in the instruction cache unit 13 nor the data cache unit 14. Accordingly, the instruction cache tag or a data cache tag is used by the instruction processing unit 12 or the computing unit 11. Specifically, at the same time the instruction or the data is loaded into the instruction cache unit 13 or the data cache unit 14, a value indicating an address in the main memory unit 16 stored in the instruction or the data is set in the instruction cache tag or the data cache tag, respectively. Therefore, when reading the instruction or the data, the instruction processing unit 12 or the computing unit 11, first, sends a query with respect to the instruction cache tag or the data cache tag and determines whether the instruction or the data to read is stored in the instruction cache unit 13 or the data cache unit 14.

Figure 3:
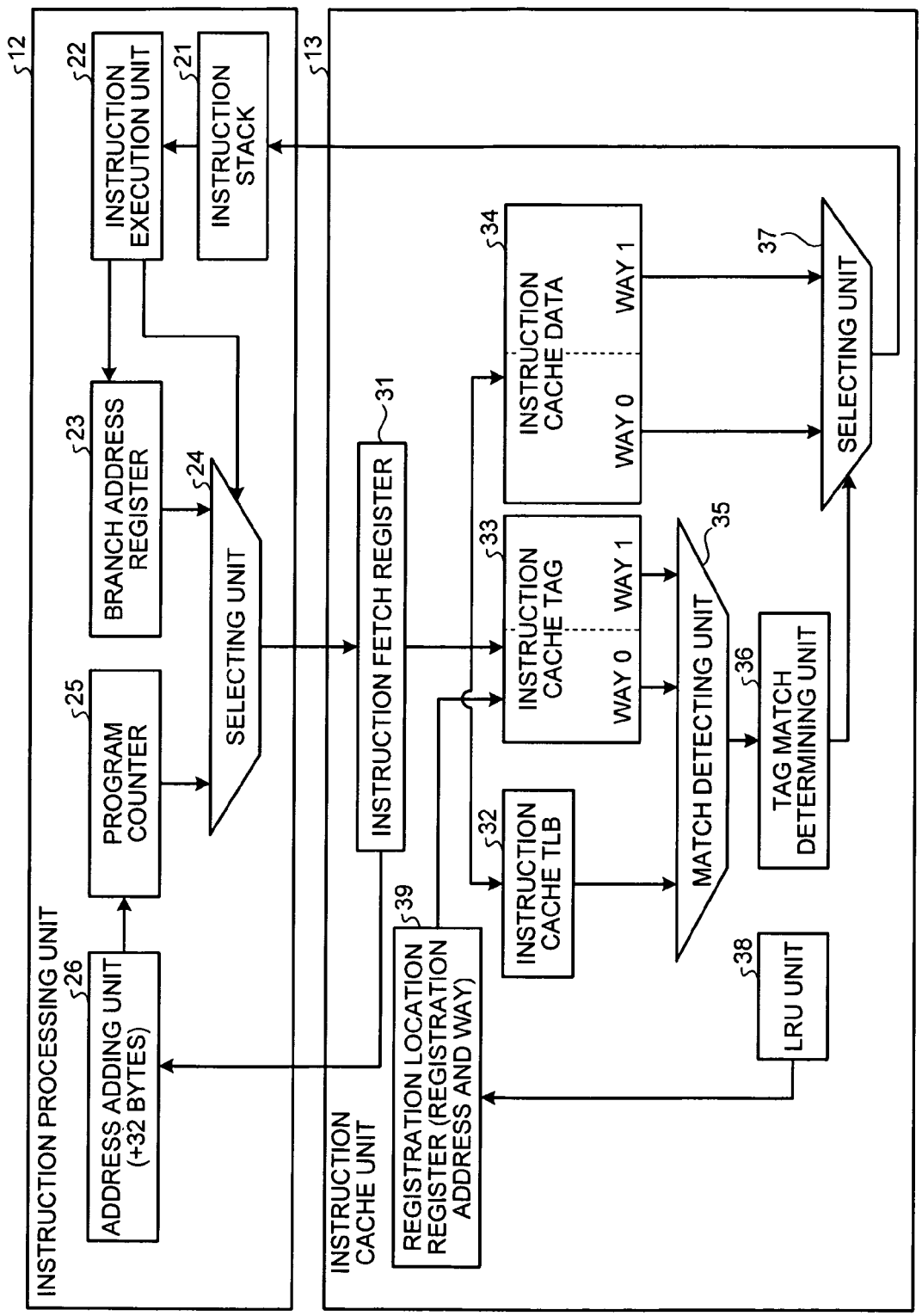
FIG. 3 is a schematic diagram illustrating the configuration of an instruction processing unit and the instruction cache unit depicted in FIG. 2.

FIG. 3 is a schematic diagram illustrating the configuration of the instruction processing unit 12 and the instruction cache unit 13. The instruction processing unit 12 includes an instruction stack 21, an instruction execution unit 22, a branch address register 23, a selecting unit 24, a program counter 25, and an address adding unit 26. The instruction cache unit 13 includes an instruction fetch register 31, an instruction cache translation look-aside buffer (TLB) 32, the instruction cache tag 33, and an instruction cache data 34. Furthermore, the instruction cache unit 13 includes a match detecting unit 35, a tag match determining unit 36, a selecting unit 37, a least recently used (LRU) unit 38, and a registration location register 39.

The instruction processing unit 12 allows the instruction execution unit 22 to execute an instruction stored in the instruction stack 21. If a branch is generated resulting from a process performed by the instruction execution unit 22, the branch address register 23 holds a branch destination address. Furthermore, the processing result of the instruction execution unit 22 is used by the selecting unit 24 as a selection signal.

The selecting unit 24 selects, in accordance with a control signal from the instruction execution unit 22, one of an address held by the program counter 25 and an address held by the branch address register 23 and outputs the selected address to the instruction fetch register 31 in the instruction cache unit 13.

The instruction fetch register 31 receives the input of the address from the instruction processing unit 12 and inputs the received address to the instruction cache TLB 32, the instruction cache tag 33, and the instruction cache data 34. Furthermore, the instruction fetch register 31 inputs the address received from the instruction processing unit 12 to the address adding unit 26 in the instruction processing unit 12. The address adding unit 26 adds a predetermined value, for example, 32 bytes to the received address and rewrites the value of the program counter 25.

The instruction cache tag 33 holds a cache index portion of the instruction address as a key and holds address bits of the instruction address other than the cache index as entries. The instruction cache tag 33 is 2-way set-associative having WAY 0 and WAY 1. In other words, the instruction cache tag 33 can hold two entries for a single cache index.

The instruction cache tag 33 searches for an entry using, as a key, the cache index portion of the instruction address that is received from the instruction fetch register 31 and performs outputs using the WAY 0 and the WAY 1.

The match detecting unit 35 compares the instruction address received from the instruction cache TLB 32 with the entries of the WAY 0 and the WAY 1 received from the instruction cache tag 33. The instruction address that is output from the instruction cache TLB 32 is output by converting a virtual address of the instruction fetch register 31 to a physical address.

If the instruction address received from the instruction cache TLB 32 matches either one of the entries of the WAY 0 and the WAY 1 received from the instruction cache tag 33, the tag match determining unit 36 notifies the selecting unit 37 of the matched WAY. If the instruction address received from the instruction cache TLB 32 does not match the input entry of the WAY 0 nor the input entry of the WAY1 received from the instruction cache tag 33, a cache miss occurs.

The instruction cache data 34 holds a cache index portion of the instruction address as a key and holds data of the instruction address as entries. The instruction cache tag 33 is 2-way set-associative having WAY 0 and WAY 1. In other words, the instruction cache tag 33 can hold two entries for a single cache index.

The instruction cache data 34 searches for an entry using, as a key, the cache index portion of the instruction address that is received from the instruction fetch register 31 and outputs data using the WAY 0 and the WAY 1.

If the selecting unit 37 receives a WAY notification from the tag match determining unit 36, the selecting unit 37 selects, from among outputs from the instruction cache data 34, an output of the notified WAY and inputs it to the instruction stack 21.

The registration location register 39 is a register that controls a registered address and a WAY in a set associative scheme. The registration location register 39 refers to the LRU unit 38 and specifies a WAY that is used when a cache is registered. Specifically, the registration location register 39 specifies a WAY, as the registration destination from among WAYs corresponding to the instruction addresses that is least recently used after it is registered.

Figure 4:
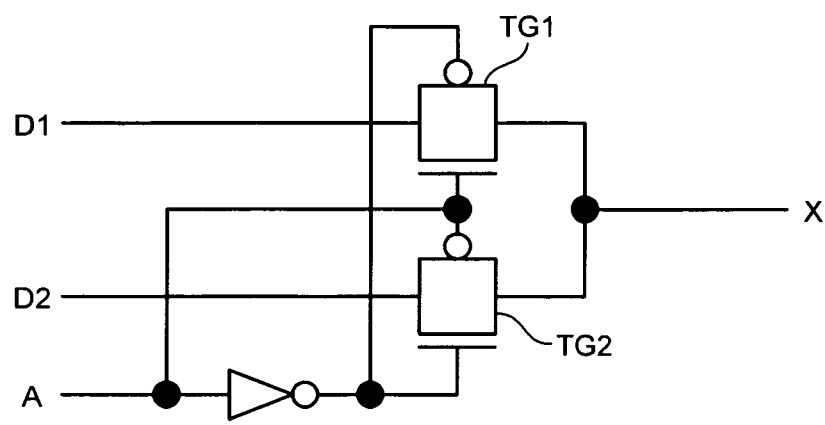
FIG. 4 is a schematic diagram illustrating the configuration of a multiplexer.

In the following, the configuration of the multiplexer will be described. FIG. 4 is a schematic diagram illustrating the configuration of the multiplexer. The multiplexers mp0_1, mp1_1, mp1_2, mp2_1 to mp2_4, mp3_1 to mp3_8, mp4_1 to mp4_16, mp5_1 to mp5_32, and mp6_1 to mp6_64 have the configuration illustrated in FIG. 4.

Specifically, the multiplexer has two transfer gates: TG1 and TG2. The transfer gate TG1 receives a first input D1. The transfer gate TG2 receives a second input D2. A control signal A controls whether a signal can pass through the transfer gates TG1 and TG2. Specifically, the control signal A is directly input to one end of the transfer gate and an inverted control signal A is input to the other end of the transfer gate. Furthermore, by reversing the connections to the transfer gates TG1 and TG2, one of the transfer gates TG1 and 2 is selected. This makes it possible to obtain an output X.

Figure 5:
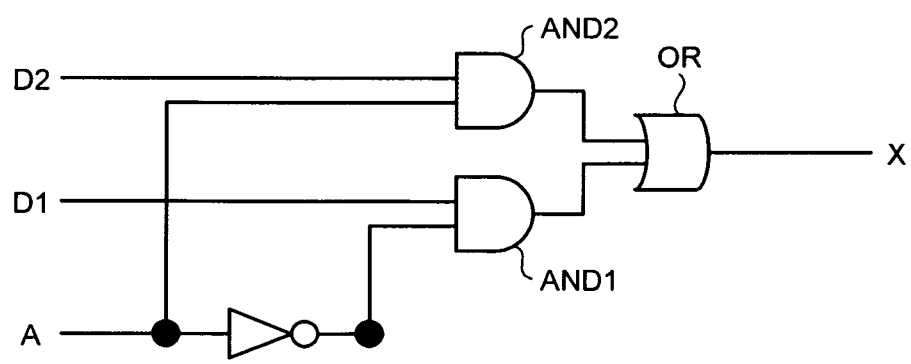
FIG. 5 is a logic circuit diagram associated with the configuration illustrated in FIG. 4.

FIG. 5 is a logic circuit diagram associated with the configuration illustrated in FIG. 4. In the logic circuit illustrated in FIG. 5, the input D1 and the control signal A are input to an AND circuit AND1. The input D2 and the inverted control signal A are input to an AND circuit AND2. Because an OR circuit OR performs an OR operation on the outputs of the AND circuits AND1 and AND2, one of the inputs D1 and D2 can be obtained as the output X.

Figure 6A:
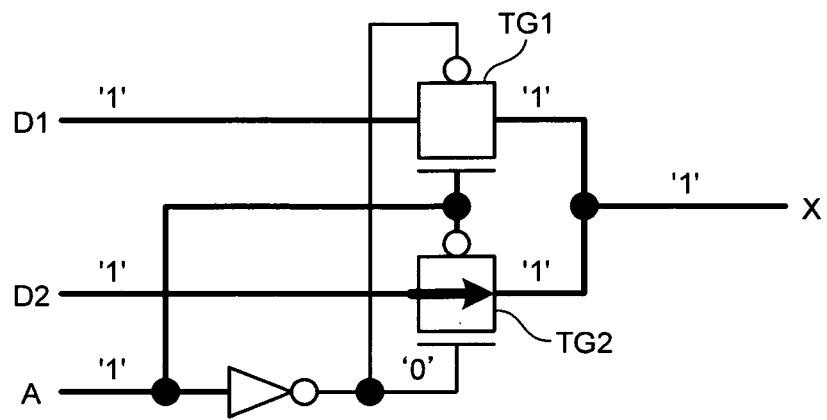
FIG. 6A is a schematic diagram illustrating the multiplexer when a control signal is 1.
Figure 6B:
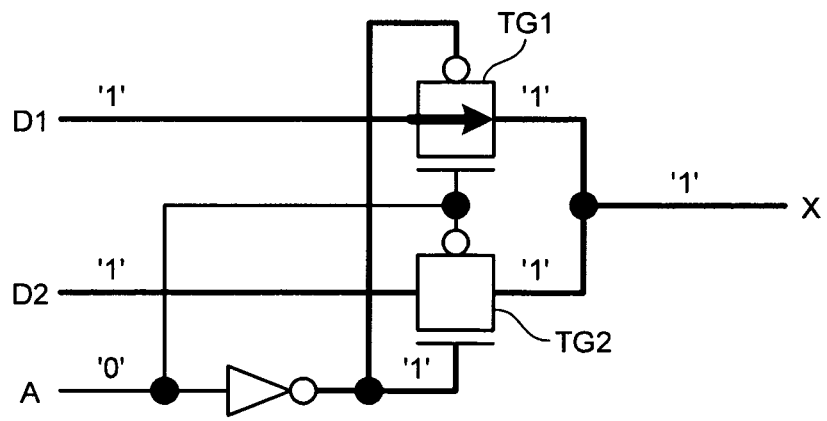
FIG. 6B is a schematic diagram illustrating the multiplexer when the control signal is 0.

FIG. 6A is a schematic diagram illustrating the multiplexer when a control signal is 1. Furthermore, FIG. 6B is a schematic diagram illustrating the multiplexer when the control signal is 0. As illustrated in FIG. 6A, if the control signal A is 1, the transfer gate TG1 does not allow the input D1 to pass and the transfer gate D2 allows the input D2 to pass. As a result, the output X has the same value as the input D2. Here, because the value of the input D2 is 1, the value of the output X is also 1 accordingly.

As illustrated in FIG. 6B, if the control signal A is 0, the transfer gate TG1 allows the input D1 to pass, and the transfer gate TG2 does not allow the input D2 to pass. As a result, the output X has the same value as the input D1. Here, because the value of the input D2 is 1, the value of the output X is also 1 accordingly.

Figure 7A:
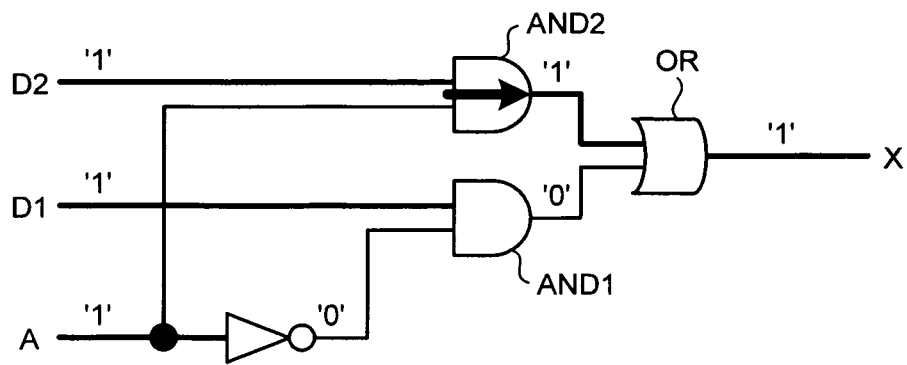
FIG. 7A is a schematic diagram illustrating a logic circuit when the control signal is 1.
Figure 7B:
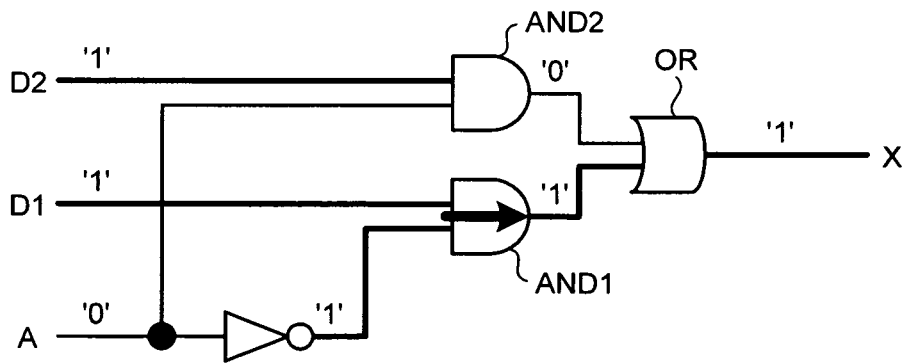
FIG. 7B is a schematic diagram illustrating the logic circuit when the control signal is 0.

FIG. 7A is a schematic diagram illustrating the logic circuit when the control signal is 1. Furthermore, FIG. 7B is a schematic diagram illustrating the logic circuit when the control signal is 0. As illustrated in FIG. 7A, if the control signal A is 1, the AND circuit AND1 outputs 0, and the AND circuit AND2 outputs 1. As a result, the output X has the same value as the input D2. Here, because the value of the input D2 is 1, the value of the output X is also 1 accordingly.

As illustrated in FIG. 7B, if the control signal A is 0, the AND circuit AND1 outputs 1 and the AND circuit AND2 outputs 0. As a result, the output X has the same value of the input D1. Here, because the value of the input D2 is 1, the value of the output X is also 1 accordingly.

In the following, the arrangement of entries in the register file will be described. To simplify the description, a case in which the cache index is 4 bits will be described. If a 4-bit cache index is arranged, the number of entries that can be cached is 16. Accordingly, the control addresses 0 to 15 are associated with the 16 entries.

FIG. 8 is a schematic diagram illustrating control addresses when the control addresses are arranged in ascending order and represented in binary numbers. As described above, in the instruction cache unit according to the first embodiment, a multiplexer group is arranged in accordance with the bits of the control address. FIG. 9 is a schematic diagram illustrating control addresses, represented in binary numbers, when the control addresses are arranged in accordance with a bit of the control addresses.

Figure 10:
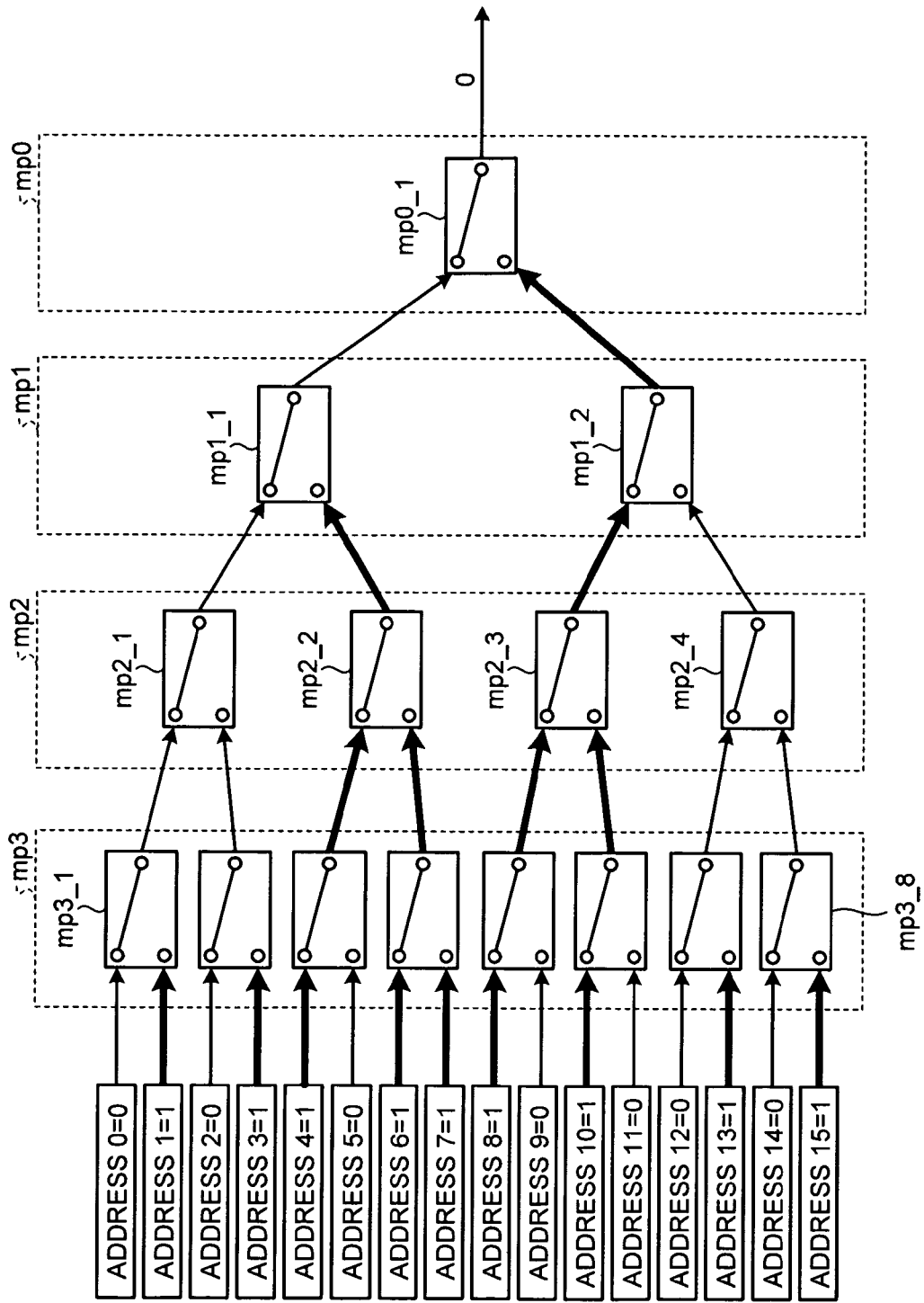
FIG. 10 is a schematic diagram illustrating a state in which entries are arranged in ascending order of the control addresses and a control address 0 is selected.

Electrical power consumption is compared, with reference to FIGS. 10 to 13, between the configuration in which entries are arranged in ascending order of the control addresses and the configuration used in the first embodiment. FIG. 10 is a schematic diagram illustrating a state in which entries are arranged in ascending order of the control addresses and a control address 0 is selected. In this case, as an example, the values of the entries of the control addresses are defined as follows:

an entry value of the control address 0=0
an entry value of the control address 1=1
an entry value of the control address 2=0
an entry value of the control address 3=1
an entry value of the control address 4=1
an entry value of the control address 5=0
an entry value of the control address 6=1
an entry value of the control address 7=1
an entry value of the control address 8=1
an entry value of the control address 9=0
an entry value of the control address 10=1
an entry value of the control address 11=0
an entry value of the control address 12=0
an entry value of the control address 13=1
an entry value of the control address 14=0
an entry value of the control address 15=1

In the state illustrated in FIG. 10, the control address 0 is selected. In such a case, all of the multiplexers included in the multiplexer groups mp0 to mp3 select an input on the upper side. In FIG. 10, the signal lines having the value 0 are indicated by the thin arrows, and the signal lines having the value 1 are indicated by the thick arrows.

Specifically, the multiplexer mp3_1 selects an entry of the control address 0 and outputs the value 0. The multiplexer mp2_1 selects the multiplexer mp3_1 and outputs the value 0. The multiplexer mp1_1 selects the multiplexer mp2_1 and outputs the value 0. The multiplexer mp0_1 selects the multiplexer mph and outputs the value 0.

Figure 11:
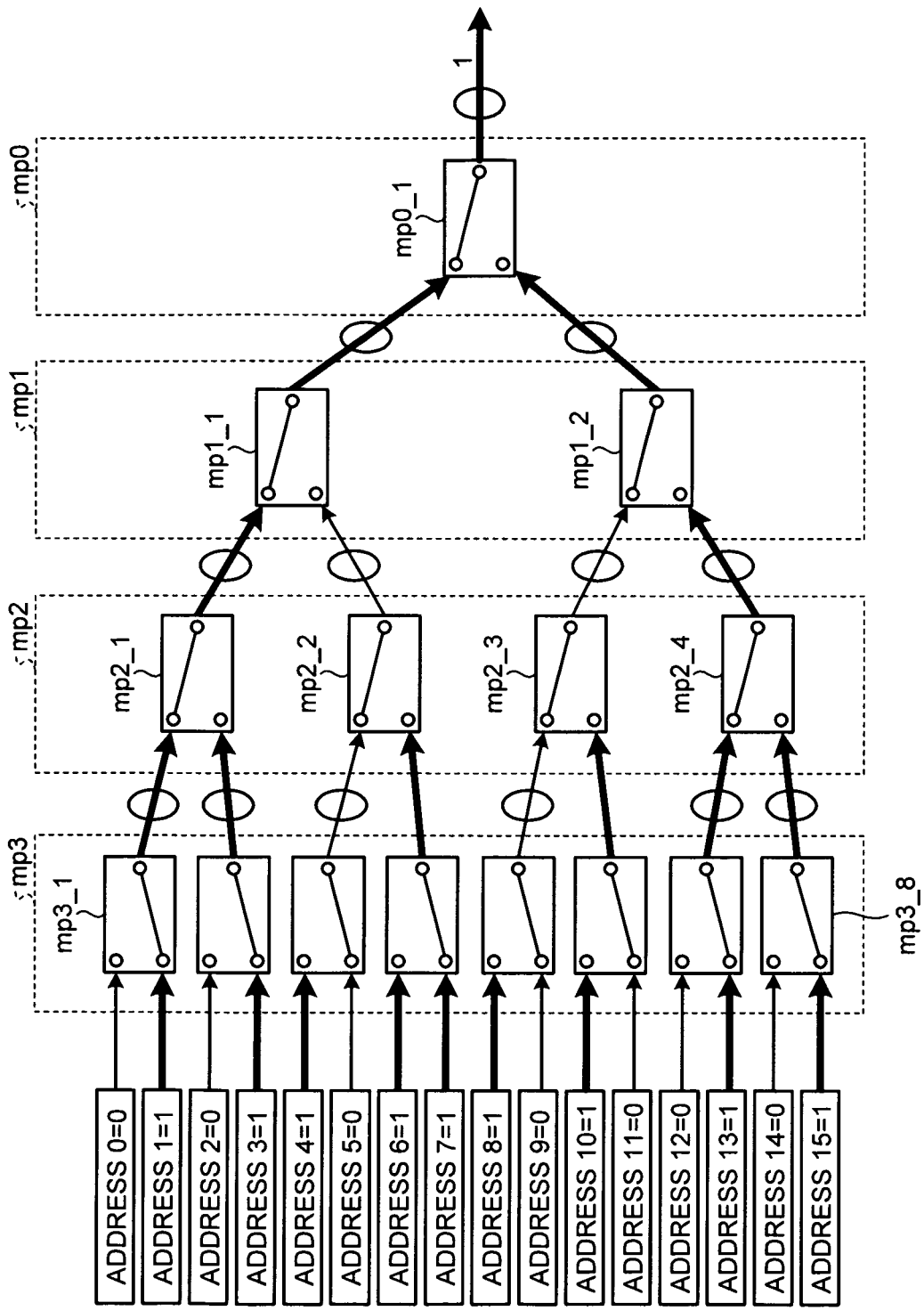
FIG. 11 is a schematic diagram illustrating a case in which the selection destination is switched to a control address 1 from the state illustrated in FIG. 10.

FIG. 11 is a schematic diagram illustrating a case in which the selection destination is switched to a control address 1 from the state illustrated in FIG. 10. If the entries are arranged in ascending order of the control addresses, the control address 1 is selected by switching the multiplexer group mp3. Accordingly, all of the multiplexers mp3_1 to mp3_8 included in the multiplexer group mp3 are switched, and electrical power is consumed by each multiplexer.

Furthermore, electrical power is consumed even in the signal lines in which output values are changed. In the example illustrated in FIG. 11, output values are changed in all of the multiplexers other than the multiplexers mp3_4 and mp3_6, thereby electrical power is consumed.

Figure 12:
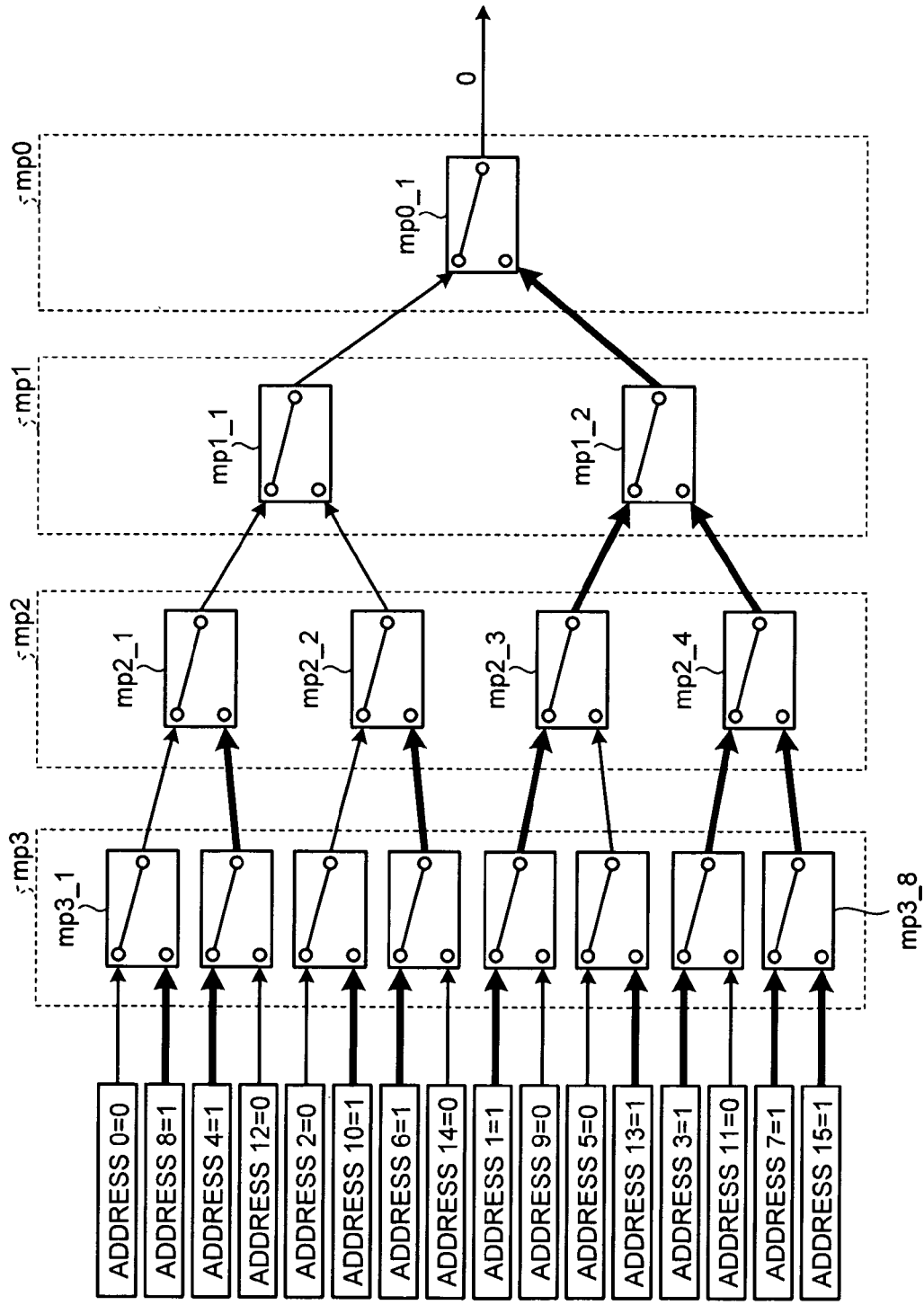
FIG. 12 is a schematic diagram illustrating a state in which a control address 0 is selected using an arrangement in a first embodiment.

FIG. 12 is a schematic diagram illustrating a state in which control address 0 is selected using an arrangement in the first embodiment. Entry values of the control addresses are the same as those in FIG. 10. In the state illustrated in FIG. 12, the control address 0 is selected. In this case, the control addresses represented in binary numbers are "0000"; therefore, all of the multiplexers included in the multiplexer groups mp0 to mp3 Select an input on the upper side. In FIG. 12, the signal lines having the value 0 are indicated by the thin arrows, and the signal lines having the value 1 are indicated by the thick arrows.

Specifically, the multiplexer mp3_1 selects an entry of the control address 0 and outputs the value 0. The multiplexer mp2_1 selects the multiplexer mp3_1 and outputs the value 0. The multiplexer mph selects the multiplexer mp2_1 and outputs the value 0. The multiplexer mp0_1 selects the multiplexer mp1_1 and outputs the value 0.

Figure 13:
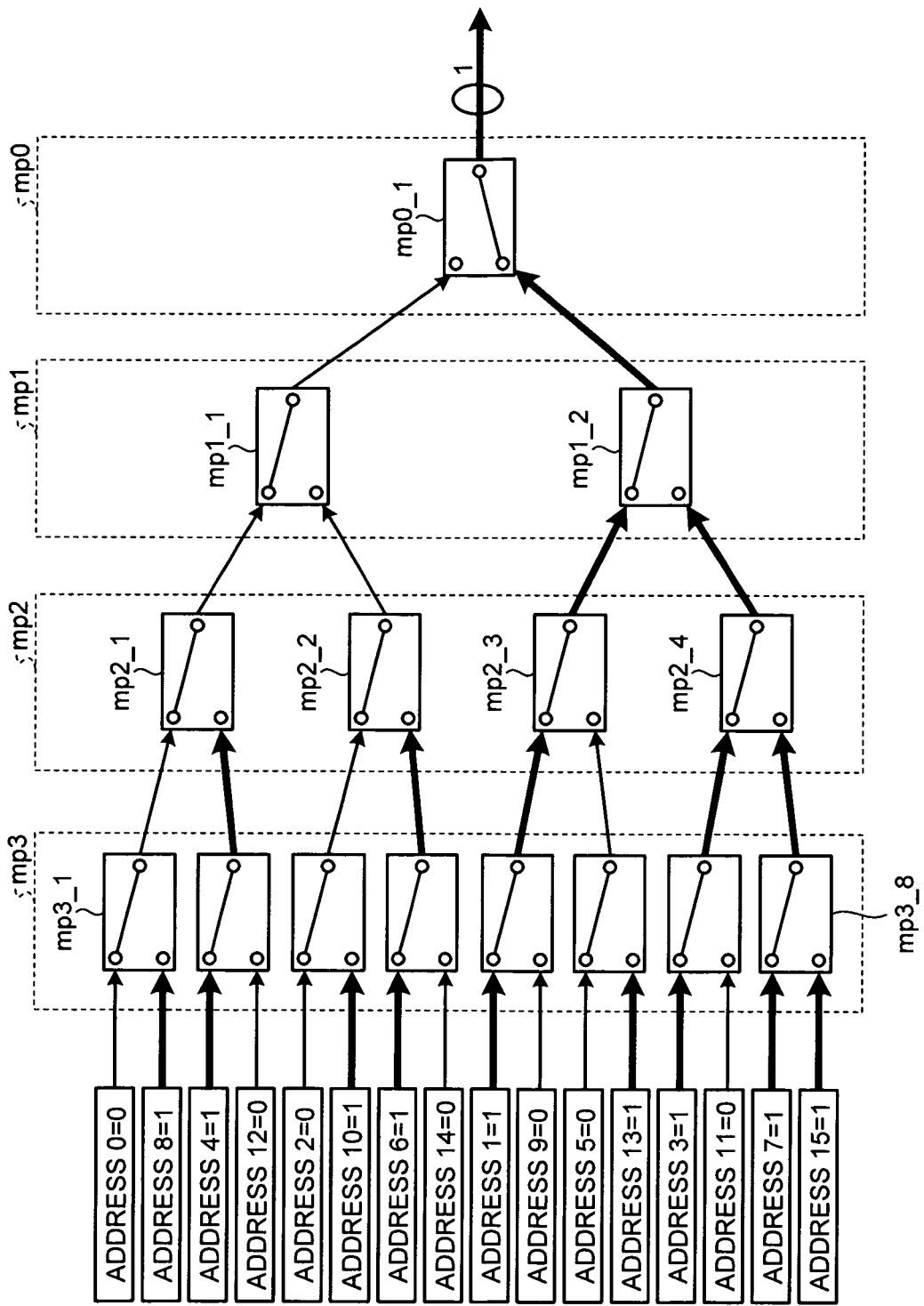
FIG. 13 is a schematic diagram illustrating a case in which the selection destination is switched to a control address 1 from the state illustrated in FIG. 12.

FIG. 13 is a schematic diagram illustrating a case in which the selection destination is switched to the control address 1 from the state illustrated in FIG. 12. With the arrangement according to the first embodiment, the control address 1 is selected by switching the multiplexer group mp0. Accordingly, only the multiplexer mp0_1 included in the multiplexer group mp0 is switched, and thus electrical power is not consumed by other multiplexers. Furthermore, the signal line whose output value is changed is only in the multiplexer mp0_1, and output values are not changed in other multiplexers.

As described above, with the cache unit and the arithmetic processing unit according to the first embodiment, by making the most use of the feature of an instruction cache memory references in which contiguous addresses are repeatedly referred to, the register files are used as the physical components of the memories of instruction cache tags. A register file selects an entry using the multiplexer groups having n stages that correspond to a cache index of n bits (n is a natural number) that is used to search for the instruction cache tags. From among multiplexer groups having n stages, a multiplexer group in an $m^{th}$ stage has $2^{(m-1)}$ multiplex circuits; the multiplexer group in the $m^{th}$ stage uses a value of an $m^{th}$ bit from the least significant bit in the cache index as a control signal. All of the multiplex circuits included in the multiplexer group in the $m^{th}$ stage are simultaneously switched in accordance with the control signal in an $m^{th}$ bit.

Accordingly, it is possible to obtain a cache unit and an arithmetic processing unit that reduce electrical power consumption for handling instruction cache tags. The disclosed technology can be used in the instruction cache tags in the cache memory of the processor including the instruction cache separated from the operand cache. Furthermore, for operand caches, shared caches, local memories, or the like, the disclosed technology can be used in application in which reference address are contiguous or the same type of reference data is used.

[b] Second Embodiment

In the first embodiment, the configuration in which electrical power consumption is reduced using the contiguity of addresses is described. However, if contiguous addresses are allocated to different cache WAYs, even though a tag memory that is constituted by the register file is used as described in the first embodiment, data to be read is changed in accordance with addresses that refer to the tag memory. Accordingly, the effect of reducing electrical power consumption depends on the similarity of addresses registered in the tag memory.

Because the capacity of the instruction cache is small and the similarity of the addresses that are referred to is high, the effect of electrical power saving can be sufficiently obtained by themselves; however, to obtain further effect of electrical power saving, it is preferable to control the registration of contiguous addresses in the same WAY. To allocate the contiguous addresses to the same cache WAY, with the configuration disclosed in a second embodiment of the present invention, a register is prepared; this register registers a cache WAY that is registered previously in a cache and a cache line address that is subsequent to the address previously registered. Then, if the subsequent address that suffers a cache miss corresponds to the register that is previously registered, it is determined that the registration of the contiguous addresses is to be performed; therefore, the address is registered in the cache WAY that has been registered in the register. With this configuration, it is possible to control the registration of data on the contiguous addresses in the same cache WAY.

However, it is preferable to avoid a case in which the contiguous addresses are continued to be registered in the same WAY and this WAY ends up being unused in a cache WAY having two or more WAYs. The instruction address that searches for a cache tag is changed in ascending order in accordance with the execution of the instruction. Because a part of the instruction address is used to refer to the cache tag, after the address that searches for the cache tag reaches the maximum address (all 1s), the address returns to the minimum address (all 0s). Then, the instruction address that searches for the cache TAG is again changed in ascending order.

Therefore, when the address is registered in the minimum address (all 0s), the register that registers both the cache WAY that is previously registered in the cache and the cache line address that is subsequent to the address previously registered is referred. If it is determined to be the registration of the contiguous address, a new cache line is registered in a cache WAY which is different from the cache WAY that is previously registered in the cache. This makes it possible to use multiple WAYs for the contiguous addresses.

Because of the high contiguity and the locality of the addresses registered in the instruction cache, in some cases, values of the content of the tag that are output from the contiguous cache lines are the same no matter which cache index is used for tag search. Accordingly, as described above, when the contiguous cache lines are registered in the same WAY to read out the register file, there is a high probability that the same value is read out from every address.

In selection circuits in each stage in the register file in which a value of data to be selected is not changed, electrical power is hardly consumed even when the value of the selection signal is changed. Accordingly, even when an address for reading a register file that is used as the cache tag is changed, electrical power consumption can be reduced.

Figure 14:
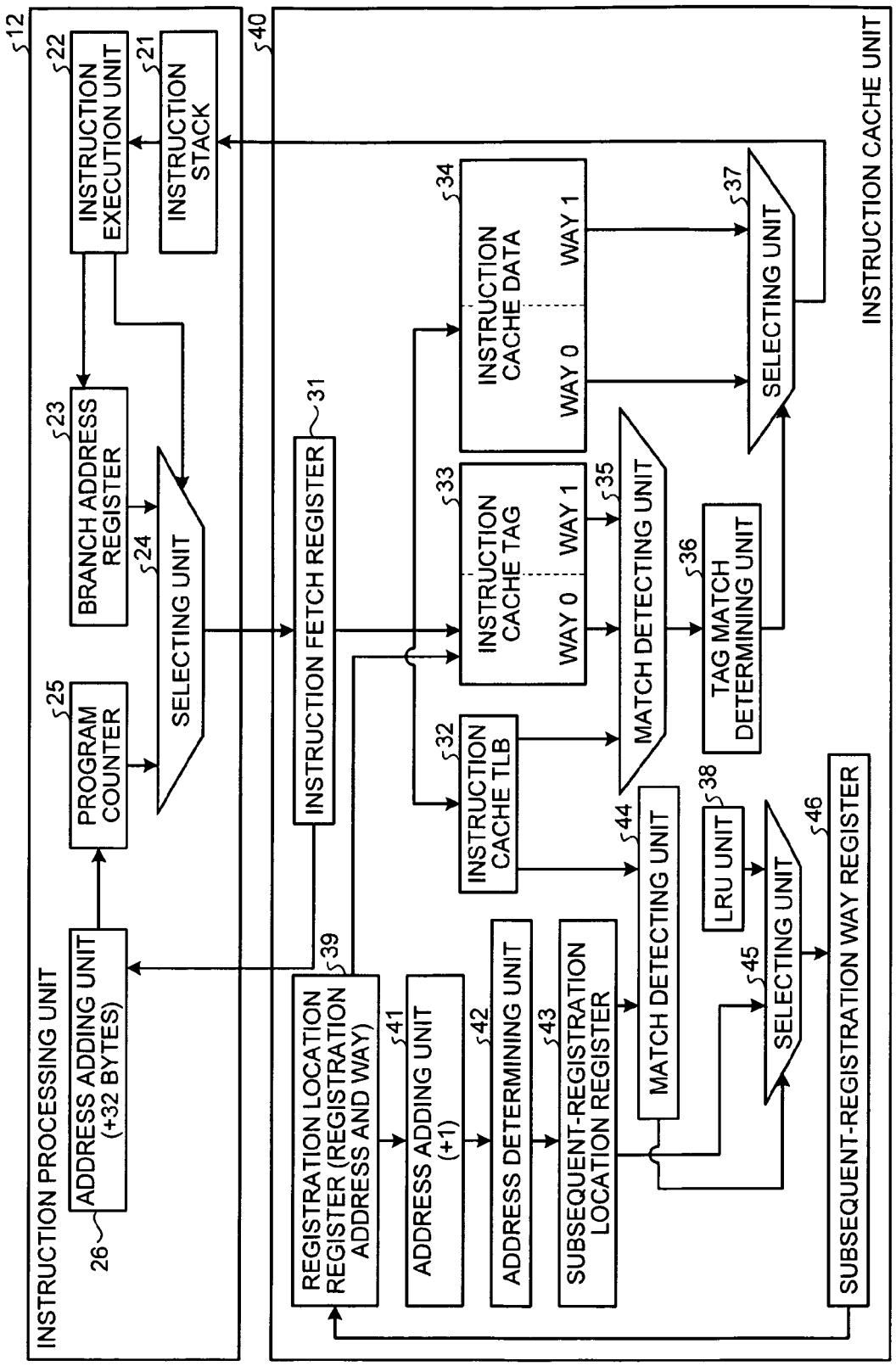
FIG. 14 is a schematic diagram illustrating an instruction cache unit according to a second embodiment.

FIG. 14 is a schematic diagram illustrating an instruction cache unit according to the second embodiment. An instruction cache unit 40 illustrated in FIG. 14 includes, in addition to the elements of the instruction cache unit 13 illustrated in FIG. 3, an address adding unit 41, an address determining unit 42, a subsequent-registration location register 43, a match detecting unit 44, a selecting unit 45, and a subsequent-registration WAY register 46. Because the other configurations and operations are the same as those illustrated in FIG. 3, parts that are the same as those in FIG. 3 are assigned the same reference numerals, and therefore a description thereof is omitted.

The address adding unit 41 sends, to the address determining unit 42, an address by adding 1 to the address that is held by the registration location register 39, i.e., the previous address that is registered in the cache. Furthermore, the address adding unit 41 sends, to the address determining unit 42, the WAY that is held by the registration location register 39, i.e., the WAY in which the cache is previously registered, without processing the WAY.

The address determining unit 42 determines whether the address obtained from the address adding unit 41 is all 0s. If the address is all 0s, the address determining unit 42 changes the WAY obtained from the address adding unit 41. If the address is other than all 0s, the address determining unit 42 maintains the WAY obtained from the address adding unit 41 without changing the WAY. The address determining unit 42 stores, in the subsequent-registration location register 43, the address and the changed WAY or the maintained WAY, all of which are obtained from the address adding unit 41.

The match determining unit 44 determines whether the instruction address that is output from the instruction cache TLB 32 corresponds to the address held by the subsequent-registration location register 43. Corresponding to the address mentioned here means that the instruction address that is output from the instruction cache TLB 32 is contiguous to the previous instruction address. The match determining unit 44 inputs the determination result to the selecting unit 45 as a control signal.

The selecting unit 45 selects, in accordance with the output from the match detecting unit 44, either one of outputs from the subsequent-registration location register 43 and the LRU unit 38 and then outputs the selected output to the subsequent-registration WAY register 46. Specifically, if the instruction address is contiguous, the subsequent-registration WAY register 46 determines a subsequent WAY to be registered in accordance with the subsequent-registration location register 43. If the instruction address is non-contiguous, the subsequent-registration WAY register 46 determines a subsequent WAY to be registered in accordance with the LRU unit 38. The output of the subsequent-registration WAY register 46 is used by the registration location register 39.

Figure 15:
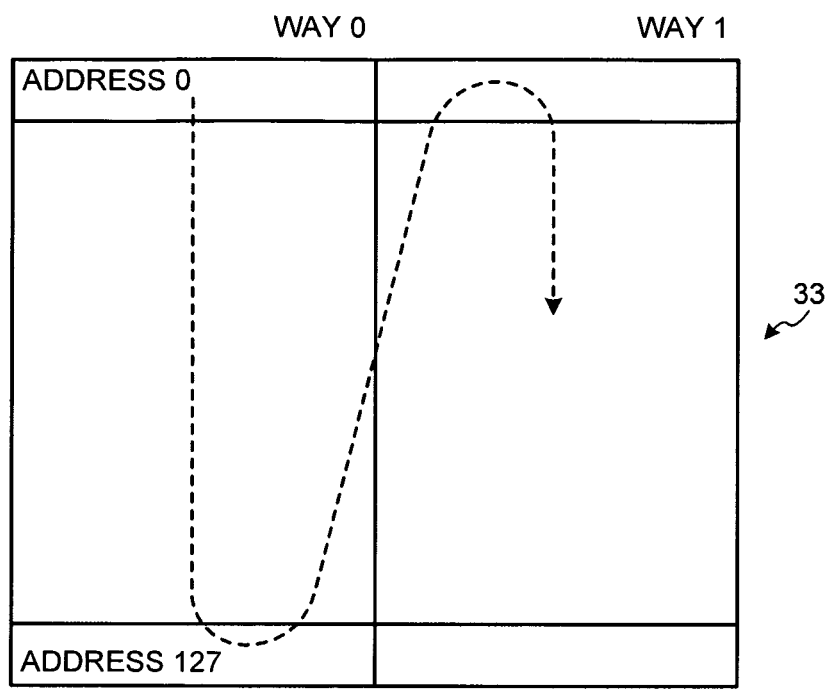
FIG. 15 is a schematic diagram illustrating registration of contiguous instructions in a case where an instruction cache unit depicted in FIG. 14 is used.

FIG. 15 is a schematic diagram illustrating registration of contiguous instructions in a case where the instruction cache unit 40 is used. In the example illustrated in FIG. 15, if contiguous instruction addresses are sequentially input, a WAY 0 is continuously selected from the addresses from the address 0 that is the minimum value of the addresses to the address 127 that is the maximum value of the addresses. Then, after a cache is registered in the address 127 that is the last address, the registration of a cache is performed from the address 0 in a WAY 1.

As described above, the cache unit according to the second embodiment has the register that registers both the previous cache WAY that is registered in a cache and a cache line address that is subsequent to the address previously registered. If the subsequent address that suffers a cache miss corresponds to the register that is previously registered, the address is registered in a cache WAY that has been registered in the register, thereby data on the contiguous addresses are collected in the same cache WAY. Accordingly, contiguous cache lines can be registered in the same WAY, thus further reducing electrical power consumption of the cache unit.

Furthermore, if the subsequent cache line address is the minimum value of the address, electrical power consumption can be reduced by switching the WAYs while multiple WAYs are effectively used.

[c] Third Embodiment

In the second embodiment, a case in which WAYs are switched when the subsequent cache line address becomes the minimum value of the address is described. However, even in a case other than that of registering an address in the minimum address, WAYs registered in a cache tag can be switched in contiguous addresses.

With the configuration disclosed in a third embodiment, an address that is used to search a cache hit is decremented by a value of one cycle of the cache index. Then, when a cache WAY corresponding to decremented address is taken out from the cache tag, a cache WAY except for a cache WAY corresponding to the decremented address is selected as a cache WAY to be registered in the cache tag, thus implementing the switching of the WAYs registered in the cache TAG in the contiguous addresses.

At this time, it is also possible to add a determination condition; to determine whether the cache WAY corresponding to the decremented address corresponds to the previous cache WAY that is registered in the cache.

Figure 16:
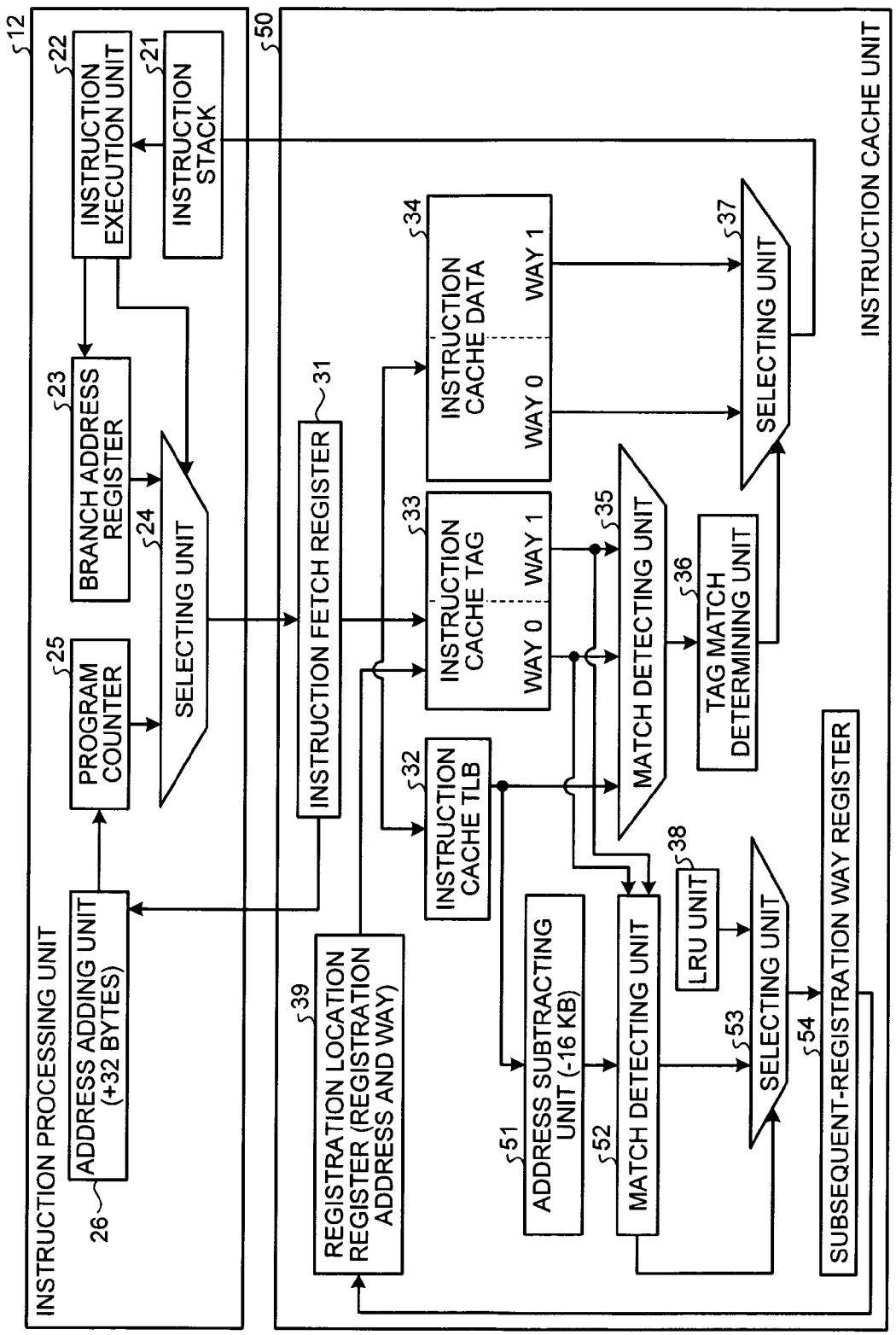
FIG. 16 is a schematic diagram illustrating an instruction cache unit according to a third embodiment.

FIG. 16 is a schematic diagram illustrating an instruction cache unit according to the third embodiment. An instruction cache unit 50 illustrated in FIG. 14 has, in addition to the configuration of the instruction cache unit 13 illustrated in FIG. 3, an address subtracting unit 51, a match detecting unit 52, a selecting unit 53, and a subsequent-registration WAY register 54. Because the other configurations and operations are the same as those illustrated in FIG. 3, parts that are the same as those in FIG. 3 are assigned the same reference numerals, and therefore a description thereof is omitted.

The address subtracting unit 51 outputs the instruction address that is output from the instruction cache TLB 32 by subtracting a value of one cycle of the cache index, e.g., 16 kB. If a cache miss occurs, the match detecting unit 52 takes out addresses that are registered in the instruction cache tag 33 and correspond to the cache WAY and compares the addresses with the decremented address that is output from the address subtracting unit 51. The match detecting unit 52 outputs the comparison result to the selecting unit 53 as a control signal.

The selecting unit 53 performs selection in accordance with the detection result of the match detecting unit 52. Specifically, if a cache WAY that corresponds to the decremented address is present, by selecting a WAY other than the corresponding cache WAY, the switching of WAYs registered in the cache TAG in the contiguous addresses is implemented. If no cache WAY that corresponds to the decremented address is present, a cache WAY held by the registration location register 39 is selected. If the address is not contiguous, WAY selection is performed in accordance with the LRU unit 38. The WAY selected by the selecting unit 53 is stored in the subsequent-registration WAY register 54.

As described above, with the cache unit according to the third embodiment, in a similar manner as in the second embodiment, data on the contiguous addresses is collected in the same cache WAY and contiguous cache lines are registered in the same WAY, thus further reducing electrical power consumption of the cache unit.

[d] Fourth Embodiment

Figure 17:
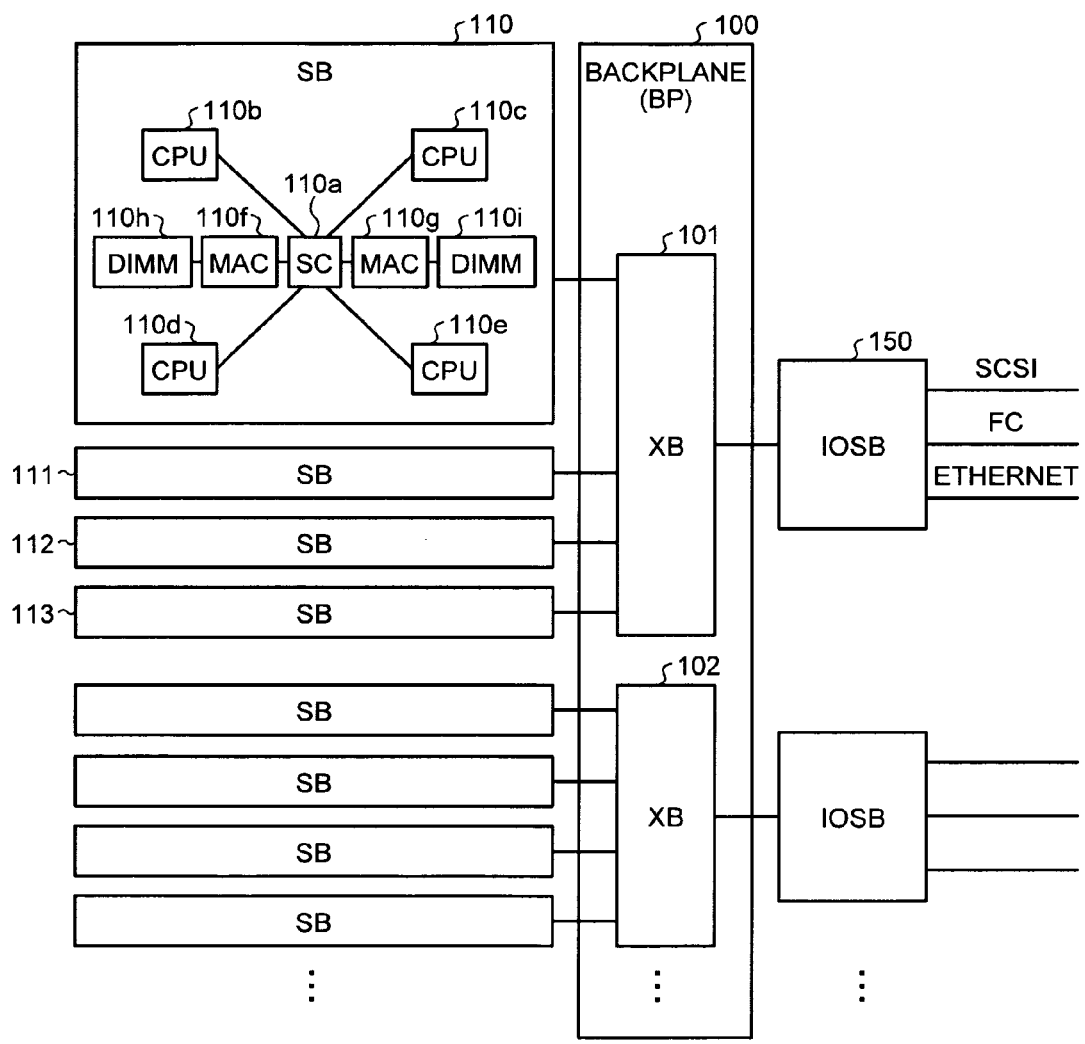
FIG. 17 is a schematic diagram illustrating the configuration of a server.

In FIG. 17, the configuration of a server that includes the cache unit and the arithmetic processing unit (processor) that are disclosed in the first to third embodiments is illustrated. FIG. 17 is a schematic diagram illustrating the configuration of the server. As illustrated in FIG. 17, the server has a backplane 100 that includes multiple crossbar switches, such as an XB 101 and an XB 102. The server also has input/output system boards (IOSBs) and system boards (SBs) for each crossbar switch. The number of crossbar switches, system boards, and input/output system boards illustrated in FIG. 17 is only for an example; therefore, the configuration is not limited thereto.

The backplane 100 is a circuit board that forms buses that connect multiple connectors. The XB 101 and XB 102 are switches that dynamically select paths of data that is exchanged between the system boards and the input/output system boards.

The SBs 110 to 113 that are connected to the XB 101 are electronic circuit boards constituting electronic devices and have the same configuration; therefore, only the configuration of the SB 110 will be described here. The SB 110 has a system controller (SC) 110a, four CPUs 110b, 110c, 110d, and 110e, memory access controllers (MACs) 110f and 110g, and dual inline memory modules (DIMMs) 110h and 110i.

The SC performs the overall control of the SB 110 by controlling a process for a data transfer between the CPUs 110b to 110e mounted on the SB 110 and the MAC 110f and the MAC 110g. The CPUs 110b to 110e are connected to other electronic devices via the SC 110a and are processors that implement the control of the caches disclosed in the first to third embodiments. The MAC 110f is connected between the DIMM 110h and the SC 110a and controls an access to the DIMM 110h. The MAC 110g is connected between the DIMM 110i and the SC 110a and controls access to the DIMM 110i. The DIMM 110h is connected to other electronic devices via the SC 110a. The DIMM 110h is a memory module that has a memory mounted on it and is used to add a memory. The DIMM 110i is connected to other electronic devices via the SC 110a. The DIMM 110i is a memory module that has a memory mounted on it and is used to add a memory.

IOSB 150 is connected to the SBs 110 to 113 via the XB 101. The IOSB 150 is also connected to an input/output device via a small computer system interface (SCSI), a fibre channel (FC), an Ethernet (registered trademark), or the like. The IOSB 150 controls a process for a data transfer between the input/output device and the XB 101. The electronic devices, such as the CPUs 110b to 110e, the MACs 110f and 110g, and the DIMM 110h and 110i mounted on the SB 110 are only an example; therefore, the type or the number of electronic devices is not limited to those illustrated in the drawing.

According to one aspect of the embodiment of the invention, the cache unit, the arithmetic processing unit, and the information processing unit advantageously reduce electrical power consumption of the instruction cache tag.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache unit comprising a register file that selects an entry indicated by a cache index of n bits (n is a positive integer) that is used to search for an instruction cache tag, using multiplexer groups having n stages respectively corresponding to the n bits of the cache index, wherein
from among the multiplexer groups having n stages, a multiplexer group in an $m^{th}$ stage has $2^{(m-1)}$ multiplex circuits, where the multiplexer group uses a value of an $m^{th}$ bit (m is a positive integer equal to or less than n) from the least significant bit in the cache index as a control signal and the multiplexer group switches all multiplex circuits included in the multiplexer group in the $m^{th}$ stage in accordance with the control signal.

2. The cache unit according to claim 1, further comprising a WAY selecting unit that selects, if a previously-registered cache line address and a subsequently-registered cache line address are contiguous, a same WAY as a WAY at the previous registration.

3. The cache unit according to claim 2, wherein, if the previously-registered cache line address is the maximum value of an address and/or if the subsequently-registered cache line address is the minimum value of an address, the WAY selecting unit selects a WAY different from the WAY at the previous registration.

4. The cache unit according to claim 2, wherein, if the previously-registered cache line address is a predetermined address and/or if the subsequently-registered cache line address is a predetermined address, the WAY selecting unit selects a WAY different from the WAY at the previous registration.

5. An arithmetic processing unit comprising:
an instruction cache unit that holds an instruction;and an instruction processing unit that processes the instruction, wherein
the instruction cache unit includes a register file that selects an entry indicated by a cache index of n bits (n is a positive integer) that is used to search for an instruction cache tag, using multiplexer groups having n stages respectively corresponding to the n bits of the cache index, and
from among the multiplexer groups having n stages, a multiplexer group in an $m^{th}$ stage has $2^{(m-1)}$ multiplex circuits, where the multiplexer group uses a value of an $m^{th}$ bit (m is a positive integer equal to or less than n) from the least significant bit in the cache index as a control signal and the multiplexer group switches all multiplex circuits included in the multiplexer group in the $m^{th}$ stage in accordance with the control signal.

6. An information processing unit comprising:
an arithmetic processing unit; and
a memory unit that supplies an instruction to the arithmetic processing unit, wherein
the arithmetic processing unit includes
an instruction cache unit that holds the instruction; and
an instruction processing unit that processes the instruction, and
the instruction cache unit includes
a register file that selects an entry indicated by a cache index of n bits (n is a positive integer) that is used to search for an instruction cache tag, using multiplexer groups having n stages respectively corresponding to the n bits of the cache index, and
from among the multiplexer group having n stages, a multiplexer group in an $m^{th}$ stage has $2^{(m-1)}$ multiplex circuits, where the multiplexer group uses a value of an $m^{th}$ bit (m is a positive integer equal to or less than n) from the least significant bit in the cache index as a control signal and the multiplexer group switches all multiplex circuits included in the multiplexer group in the $m^{th}$ stage in accordance with the control signal.

\* \* \* \* \*

UNITED STATES PATENT AND TRADEMARK OFFICE
CERTIFICATE OF CORRECTION

| | | |
|---|---|---|
| PATENT NO. | : 8,862,829 B2 | Page 1 of 1 |
| APPLICATION NO. | : 12/929026 | |
| DATED | : October 14, 2014 | |
| INVENTOR(S) | : Iwao Yamazaki | |

It is certified that error appears in the above-identified patent and that said Letters Patent is hereby corrected as shown below:

In the Claims

Column 16, line 67, In Claim 5, delete "instruction;and" and insert -- instruction; and --, therefor.

Signed and Sealed this
Fifth Day of May, 2015

Michelle K. Lee
*Director of the United States Patent and Trademark Office*